United States Patent
Cronin (10) Patent No.: US 9,711,146 B1
(45) Date of Patent: Jul. 18, 2017

(54) WIRELESS SYSTEM FOR SOCIAL MEDIA MANAGEMENT

(71) Applicant: ProSports Technologies, LLC, Miami, FL (US)

(72) Inventor: John Cronin, Bonita Springs, FL (US)

(73) Assignee: PROSPORTS TECHNOLOGIES, LLC, Miami, FL (US)

( * ) Notice: Subject to any disclaimer, the term of this patent is extended or adjusted under 35 U.S.C. 154(b) by 0 days.

(21) Appl. No.: 14/731,384

(22) Filed: Jun. 4, 2015

Related U.S. Application Data (60) Provisional application No. 62/008,483, filed on Jun. 5, 2014.

(51) Int. Cl.
| | | |
|---|---|---|
| *G10L 15/18* | (2013.01) | |
| *G10L 15/26* | (2006.01) | |
| *G06F 17/30* | (2006.01) | |
| *G10L 21/02* | (2013.01) | |

(52) U.S. Cl.
CPC .................... *G10L 15/26* (2013.01)

(58) Field of Classification Search
CPC ......... G10L 15/18; G10L 15/26; G10L 21/02; G06F 17/30
USPC ............... 704/226, 257, 235, 231; 379/88.01
See application file for complete search history.

(56) References Cited

U.S. PATENT DOCUMENTS

| | | |
|---|---|---|
| 6,487,534 B1 | 11/2002 | Thelen et al. |
| 6,622,084 B2 | 9/2003 | Cardno et al. |
| 6,633,852 B1 | 10/2003 | Heckerman et al. |
| 6,980,966 B1 | 12/2005 | Sobrado et al. |
| 7,082,427 B1 | 7/2006 | Seibel et al. |
| 7,715,723 B2 | 5/2010 | Kagawa et al. |
| 7,800,646 B2 | 9/2010 | Martin |

(Continued)

FOREIGN PATENT DOCUMENTS

| | | |
|---|---|---|
| CN | 102843186 | 12/2012 |
| EP | 1 096 715 | 8/2006 |

(Continued)

OTHER PUBLICATIONS

U.S. Appl. No. 15/078,778, John Cronin, Social Network System, filed Mar. 23, 2016.

(Continued)

*Primary Examiner* — Pierre-Louis Desir
*Assistant Examiner* — Seong Ah A Shin
(74) *Attorney, Agent, or Firm* — Polsinelli LLP (57) ABSTRACT

A user may speak an audio input into a microphone of a recorder device (e.g., a sport helmet). The user device then transmits the audio input to a receiver. The receiver, upon receiving the audio input, routes the audio to a processor that processes the audio input to detect a spoken activation code. The processor then parses a subset of the audio input (e.g., the subset including one or more words) following the activation code and generates textual data based the parsed audio subset. The textual data may optionally be edited to replace one or more pre-identified catchphrases (e.g., swear-words or product names) with replacement phrases (e.g., swear censors) or hyperlinks (e.g., leading to product websites). The textual data is then transmitted to reader devices via transmitters, which may optionally transmit the textual data to a selective group of reader devices (e.g., stadium attendees).

19 Claims, 7 Drawing Sheets

(56) References Cited

U.S. PATENT DOCUMENTS

| | | | |
|---|---|---|---|
| 7,818,176 B2 | 10/2010 | Freeman et al. | |
| 7,881,702 B2 | 2/2011 | Heyworth et al. | |
| 7,970,608 B2 | 6/2011 | Madhavapeddi et al. | |
| 8,090,707 B1 | 1/2012 | Orttung et al. | |
| 8,183,997 B1 | 5/2012 | Wong et al. | |
| 8,253,586 B1 | 8/2012 | Matak | |
| 8,254,535 B1 | 8/2012 | Madhavapeddi et al. | |
| 8,265,612 B2 | 9/2012 | Athsani et al. | |
| 8,290,925 B1* | 10/2012 | Anandan | G06F 17/2775 707/707 |
| 8,355,912 B1 | 1/2013 | Keesey et al. | |
| 8,472,988 B2 | 6/2013 | Metcalf et al. | |
| 8,502,717 B2 | 8/2013 | Lin et al. | |
| 8,502,718 B2 | 8/2013 | Chiu et al. | |
| 8,543,404 B2 | 9/2013 | Moore et al. | |
| 8,560,323 B2 | 10/2013 | Madhavapeddi et al. | |
| 8,577,685 B2 | 11/2013 | Morrison | |
| 8,589,667 B2 | 11/2013 | Mujtaba et al. | |
| 8,611,930 B2 | 12/2013 | Louboutin et al. | |
| 8,620,344 B2 | 12/2013 | Huang et al. | |
| 8,626,465 B2 | 1/2014 | Moore et al. | |
| 8,630,216 B2 | 1/2014 | Deivasigamani et al. | |
| 8,660,501 B2 | 2/2014 | Sanguinetti | |
| 8,665,118 B1 | 3/2014 | Woodard et al. | |
| 8,696,113 B2 | 4/2014 | Lewis | |
| 8,706,044 B2 | 4/2014 | Chang et al. | |
| 8,724,723 B2 | 5/2014 | Panicker et al. | |
| 8,750,207 B2 | 6/2014 | Jeong et al. | |
| 8,793,094 B2 | 7/2014 | Tam et al. | |
| 8,816,868 B2 | 8/2014 | Tan et al. | |
| 8,831,529 B2 | 9/2014 | Toh et al. | |
| 8,831,655 B2 | 9/2014 | Burchill et al. | |
| 8,836,851 B2 | 9/2014 | Brunner | |
| 8,843,158 B2 | 9/2014 | Nagaraj | |
| 8,849,308 B2 | 9/2014 | Marti et al. | |
| 8,862,060 B2 | 10/2014 | Mayor | |
| 8,873,418 B2 | 10/2014 | Robinson et al. | |
| 8,874,090 B2 | 10/2014 | Abuan et al. | |
| 8,917,632 B2 | 12/2014 | Zhou et al. | |
| 8,934,921 B2 | 1/2015 | Marti et al. | |
| 9,343,066 B1 | 5/2016 | Cronin | |
| 2002/0099574 A1 | 7/2002 | Cahill et al. | |
| 2004/0117528 A1 | 6/2004 | Beacher et al. | |
| 2005/0160270 A1 | 7/2005 | Goldberg et al. | |
| 2005/0207596 A1 | 9/2005 | Beretta et al. | |
| 2006/0025214 A1* | 2/2006 | Smith | A63F 13/12 463/30 |
| 2006/0095329 A1 | 5/2006 | Kim | |
| 2007/0032945 A1 | 2/2007 | Kaufman | |
| 2007/0136128 A1 | 6/2007 | Janacek et al. | |
| 2007/0282621 A1 | 12/2007 | Altman et al. | |
| 2007/0290888 A1 | 12/2007 | Reif et al. | |
| 2008/0114633 A1 | 5/2008 | Wolf et al. | |
| 2008/0134282 A1 | 6/2008 | Fridman et al. | |
| 2008/0317263 A1* | 12/2008 | Villarreal, Jr. | A42B 3/30 381/120 |
| 2009/0005040 A1 | 1/2009 | Bourne | |
| 2009/0198778 A1 | 8/2009 | Priebe | |
| 2010/0057743 A1 | 3/2010 | Pierce | |
| 2010/0070312 A1 | 3/2010 | Hunt | |
| 2010/0086107 A1 | 4/2010 | Tzruya | |
| 2010/0201362 A1* | 8/2010 | Holman, III | G01N 24/08 324/310 |
| 2010/0208082 A1 | 8/2010 | Buchner et al. | |
| 2011/0029894 A1 | 2/2011 | Eckstein | |
| 2011/0035220 A1 | 2/2011 | Opaluch | |
| 2011/0211524 A1 | 9/2011 | Holmes et al. | |
| 2011/0282860 A1 | 11/2011 | Baarman et al. | |
| 2012/0022875 A1 | 1/2012 | Cross et al. | |
| 2012/0023390 A1 | 1/2012 | Howes et al. | |
| 2012/0078667 A1 | 3/2012 | Denker et al. | |
| 2012/0092190 A1 | 4/2012 | Stefik et al. | |
| 2012/0201362 A1* | 8/2012 | Crossan | G10L 15/26 379/88.01 |
| 2012/0262305 A1 | 10/2012 | Woodard et al. | |
| 2012/0303390 A1 | 11/2012 | Brook et al. | |
| 2012/0303753 A1 | 11/2012 | Hansen | |
| 2012/0331058 A1 | 12/2012 | Huston et al. | |
| 2013/0018810 A1 | 1/2013 | VonAllmen | |
| 2013/0054375 A1 | 2/2013 | Sy et al. | |
| 2013/0122936 A1 | 5/2013 | Hudson et al. | |
| 2013/0124234 A1 | 5/2013 | Nilsson et al. | |
| 2013/0126713 A1 | 5/2013 | Haas et al. | |
| 2013/0141555 A1 | 6/2013 | Ganick et al. | |
| 2013/0165086 A1 | 6/2013 | Doulton | |
| 2013/0167290 A1* | 7/2013 | Ben Ezra | A63B 71/10 2/425 |
| 2013/0185102 A1 | 7/2013 | Grossi | |
| 2013/0227011 A1 | 8/2013 | Sharma et al. | |
| 2013/0238370 A1 | 9/2013 | Wiseman et al. | |
| 2013/0254234 A1 | 9/2013 | Pierce | |
| 2013/0265174 A1 | 10/2013 | Scofield et al. | |
| 2013/0279917 A1 | 10/2013 | Son et al. | |
| 2013/0303192 A1 | 11/2013 | Louboutin | |
| 2013/0304691 A1 | 11/2013 | Pinckney et al. | |
| 2013/0317835 A1 | 11/2013 | Mathew | |
| 2013/0324274 A1* | 12/2013 | Stites | G09B 19/0038 473/209 |
| 2013/0328917 A1 | 12/2013 | Zambetti et al. | |
| 2013/0331087 A1 | 12/2013 | Shoemaker | |
| 2013/0331118 A1 | 12/2013 | Chhabra | |
| 2013/0331137 A1 | 12/2013 | Burchill | |
| 2013/0332108 A1 | 12/2013 | Patel | |
| 2013/0332156 A1 | 12/2013 | Tackin | |
| 2013/0336662 A1 | 12/2013 | Murayama et al. | |
| 2013/0343762 A1 | 12/2013 | Murayama et al. | |
| 2014/0012918 A1 | 1/2014 | Chin et al. | |
| 2014/0019172 A1 | 1/2014 | Oxenham et al. | |
| 2014/0025235 A1 | 1/2014 | Levien et al. | |
| 2014/0032250 A1 | 1/2014 | Oxenham et al. | |
| 2014/0032377 A1 | 1/2014 | Oxenham et al. | |
| 2014/0036088 A1 | 2/2014 | Gabriel | |
| 2014/0046802 A1 | 2/2014 | Hosein et al. | |
| 2014/0062773 A1 | 3/2014 | MacGougan | |
| 2014/0065962 A1 | 3/2014 | Le | |
| 2014/0071221 A1 | 3/2014 | Dave | |
| 2014/0081882 A1 | 3/2014 | Govindaraman | |
| 2014/0095219 A1 | 4/2014 | Zises | |
| 2014/0095337 A1 | 4/2014 | Pigeon et al. | |
| 2014/0105084 A1 | 4/2014 | Chhabra | |
| 2014/0129629 A1 | 5/2014 | Savir et al. | |
| 2014/0129962 A1 | 5/2014 | Lineberger et al. | |
| 2014/0136196 A1 | 5/2014 | Wu et al. | |
| 2014/0139380 A1 | 5/2014 | Ouyang | |
| 2014/0141803 A1 | 5/2014 | Marti | |
| 2014/0162628 A1 | 6/2014 | Bevelacqua | |
| 2014/0167794 A1 | 6/2014 | Nath | |
| 2014/0168170 A1 | 6/2014 | Lazarescu | |
| 2014/0171114 A1 | 6/2014 | Marti | |
| 2014/0180820 A1 | 6/2014 | Louboutin | |
| 2014/0189937 A1 | 7/2014 | Pietrzak et al. | |
| 2014/0191979 A1 | 7/2014 | Tsudik | |
| 2014/0200053 A1 | 7/2014 | Balasubramanian | |
| 2014/0222335 A1 | 8/2014 | Piemonte | |
| 2014/0222531 A1 | 8/2014 | Jacobs et al. | |
| 2014/0232633 A1 | 8/2014 | Shultz | |
| 2014/0232634 A1 | 8/2014 | Piemonte | |
| 2014/0241730 A1 | 8/2014 | Jovicic et al. | |
| 2014/0247279 A1 | 9/2014 | Nicholas | |
| 2014/0247280 A1 | 9/2014 | Nicholas | |
| 2014/0266804 A1 | 9/2014 | Asadpour | |
| 2014/0269562 A1 | 9/2014 | Burchill | |
| 2014/0274150 A1 | 9/2014 | Marti | |
| 2014/0283135 A1 | 9/2014 | Shepherd | |
| 2014/0293959 A1 | 10/2014 | Singh | |
| 2014/0358545 A1* | 12/2014 | Robichaud | G10L 15/18 704/257 |
| 2014/0363168 A1 | 12/2014 | Walker | |
| 2014/0364089 A1 | 12/2014 | Lienhart | |
| 2014/0364148 A1 | 12/2014 | Block | |
| 2014/0365120 A1 | 12/2014 | Vulcano | |
| 2014/0375217 A1 | 12/2014 | Feri et al. | |
| 2015/0011242 A1 | 1/2015 | Nagaraj | |

(56) References Cited

U.S. PATENT DOCUMENTS

| | | | |
|---|---|---|---|
| 2015/0026623 A1 | 1/2015 | Horne | |
| 2015/0031397 A1 | 1/2015 | Jouaux | |
| 2015/0105035 A1* | 4/2015 | de Oliveira | H04B 1/385 455/90.3 |
| 2015/0106085 A1* | 4/2015 | Lindahl | G10L 15/32 704/231 |
| 2015/0154513 A1 | 6/2015 | Kennedy et al. | |
| 2015/0170099 A1 | 6/2015 | Beach-Drummond | |
| 2015/0220940 A1 | 8/2015 | Tuteja et al. | |
| 2015/0242889 A1 | 8/2015 | Zamer et al. | |
| 2015/0347928 A1 | 12/2015 | Boulanger et al. | |
| 2015/0379478 A1 | 12/2015 | Klemm et al. | |

FOREIGN PATENT DOCUMENTS

| | | |
|---|---|---|
| WO | WO 00/51259 | 8/2000 |
| WO | WO 2009/104921 | 8/2009 |
| WO | WO 2013/051009 | 4/2013 |
| WO | WO 2013/089236 | 6/2013 |

OTHER PUBLICATIONS

U.S. Appl. No. 14/798,201 Final Office Action mailed Jun. 1, 2016.
U.S. Appl. No. 14/798,339 Final Office Action mailed Mar. 24. 2016.
U.S. Appl. No. 14/840,840 Office Action mailed Mar. 15, 2016.
U.S. Appl. No. 14/840,855 Final Office Action mailed Apr. 14, 2016.
U.S. Appl. No. 14/840,840 Office Action mailed Jul. 1, 2016.
U.S. Appl. No. 14/798,201 Office Action mailed Nov. 1, 2016.
U.S. Appl. No. 14/840,840 Final Office Action mailed Dec. 29, 2016.
U.S. Appl. No. 14/788,754, John E. Cronin, Social Network System, filed Jun. 30, 2015.
U.S. Appl. No. 14/798,201, John Cronin, Information Map Placement, filed Jul. 13, 2015.
U.S. Appl. No. 14/798,339, John Cronin, Social Media Connection for Venue Interactions, Jul. 13, 2015.
U.S. Appl. No. 14/840,840, John E. Cronin, Event Tailgating Community Management, filed Aug. 31, 2015.
U.S. Appl. No. 14/840,855, John E. Cronin, Event Tailgating Parking Management, filed Aug. 31, 2015.
Chan, Casey; "NFL Helmets Are Finally Using Technologies to Make Things Not Suck", Gizmodo, Aug. 22, 2012. http://Gizmodo.com/5937115/nfl-helmets-are-finally-using-technology-to-make-things-not-suck.
"Cisco Stadiumvision Mobile Solution", Cisco, Aug. 1, 2013.
"Create Innovative Services with Play Apps", Date of Download: Jan. 16, 2014, http://www.oledcomm.com/LIFI.html. Oledcomm-France LiFi.
Danakis, C et al.; "Using a CMOS Camera Sensor for Visible Light Communication"; 3rd IEEE Workshop on Optical Wireless Communications; [online], Dec. 3-7, 2012 [retrieved Aug. 14, 2015]. Retrieved from the Internet: <URL: https://195.134.65.236/IEEE Globecom 2012/papers/p1244-danakis.pdf> pp. 1244-1248.
Dawson, Keith; "LiFi in the Real World" All LED Lighting—Illuminating The Led Community, Jul. 31, 2013.
Gonzalez, Antonio; "NFL's helmet radios back on air", The Associated Press, telegram.com, Published Aug. 15, 2012.
Gorman, Michael; "Outstanding Technology brings visible light communication to phones and tablets via dongle and LEDs", Edgadget International Editions, Jul. 16, 2012.
Grebe, Helmut; "Coming soon: the "Twitter Helmet" (/2014/coming-soon-the-twitter-helmet)", All Twitter Blogs, Apr. 1, 2014.
Haas, Harald; "Delivering safe and secure wireless communications", pureLiFi. Date of download: Jan. 16, 2014 http://purelifi.co.uk/.
"How It Works", Ticketfly.com (http://start.ticketfly.com/platform/how-it-works/) Jan. 1, 2010.
"iPhone and Android Parking App", by ParkWhiz, Aug. 8, 2014.
Interactive Seat Map FAQs. Official Ticketmaster site. May 2, 2014. http://www.ticketmaster.com/interactiveseatm ap/faq. htm 1.
Khan, Mehwish; "Mobilink Introduces Mobilink Voiler, a Voice-Based Social Networking Service", Propakistani Telecom and IT News, Dec. 20, 2013.
Kim, Torrey; "5 Free Apps That Help You Find Parking Discounts", Mobile Coupons & Deals Expert, About.com, Date of download: Aug. 1, 2014.
"KLM Meet & Seat", KLM.com, May 2, 2014. http://www.klm.com/travel/us en/prepare for travel/on board/meet and seat.htm
Kumar, Navin; "Visible Light Communications Systems Conception and VIDAS", IETE Technical Review, Vol. 25, Issue 6, Nov.-Dec. 2008. Date of download: Nov. 19, 2009. http://www.tr.ietejournals.org.
Levi's Stadium Mobile App, Aug. 1, 2014.
LiFi Overview—Green wireless mobile communication—LiFi Technology. Date of download: Jan. 16, 2014.
Li, Yang et al., "VICO: A Framework for Configuring Indoor Visible Light Communication Networks" Aug. 11, 2012, Mobile Adhoc and Sensor Systems (MASS), 2012 IEEE 9th International Conference, Las Vegas, NV.
McConky et al., Katie T.; "Automating Battlefield Event Reporting Using Conceptual Spaces and Fuzzy Logic for Passive Speech Interpretation", Military Communications Conference, 2009, MILCOM 2009. IEEE, Oct. 18-21, 2009.
"Minnesota Theater Offers 'Tweet Seats' to Smartphone Addicts", Huffington Post, Dec. 28, 2012.
Montero, Eric, "Design and Implementation of Color-Shift Keying for Visible Light Comunications", Sep. 2013, McMaster University.
"New Tailgate Parking Available for 2014 O'Reilly Auto Parts Route 66 NHRA Nationals", Chicagoland Speedway, Apr. 14, 2014.
Nguyen et al., "A Novel like switching scheme using pre-scanning and RSS prediction in visible light communication networks", EURASIP Journal on Wireless Communications and Networking, 2013.
Ogasawara, Todd; "StartTalking: Free Android App for Handsfree Twitter, Facebook, & Text Messaging", SocialTimes, Sep. 30, 2010.
Ogawa; "Article about VLC Guidance developed", Visible Light Communications Consortium (VLCC), Aug. 31, 2012.
Ogawa; "iPhone app from CASIO", Visible Light Communications Consortium (VLCC), Apr. 26, 2012.
Ostrow, Adam; "Update Twitter and Your Facebook Status Using Voice", Mashable.com, Oct. 29, 2008.
Parekh, Rupal; "Is Voice-Based Bubbly The New Twitter?", Adage.com—Global News, Mar. 11, 2010.
"Pay-By-Phone Parking Meter App Expanding Citywide This Summer", CBS Chicago Local news, May 6, 2014.
Povey, Gordon, "VLC for Location, positioning and navigation", Jul. 27, 2011, http://visiblelightcomm.com/vlc-location-positioning-and-n . . . .
Rambabu et al., K.; "An Optimal Driving System by Using Wireless Helmet", International Journal of Science, Engineering and Technologies Research (IJSETR) vol. 2, Iss. 9, Sep. 2013. ISSN: 2278-7798.
Rosenthal, Gregg; "Report: Owners planning to have players miked-up", Around The League, NFL.com, Published Jul. 4, 2012.
Salter, Chuck; "TicketMaster Teams With Facebook So You Can Sit Next To Your Friends", Fast Company, Aug. 24, 2011.
"Seating chart software made with you in mind", Table Plan Software 1 Social Tables, Date of Download: May 2, 2014 https://socialtables.com/seating-chart-software.
"Social Seating and Booking Platform", SeatID. Date of Download: May 2, 2014 http://www.seatid.com/product/.
Sorgi, Jay; "NFL considers in-stadium audio with miked-up players, coaches", Todays TMJ4, Aug. 28, 2013.
"Speech-to-text server replace with product name advertising twitter tweet facebook social", Google Search Oct. 28, 2013.
"Sports Communications System", Telex Intercom, Feb. 22, 2010.
Stadium App 1 Levi's Stadium, Aug. 6, 2014.
Tailgate Scout Home page <http://tailgatescout.com/site> Date of download: Oct. 15, 2015.

(56) References Cited

OTHER PUBLICATIONS

Tailgate Scout Features page <http://tailgatescout.com/site/features/> Date of download: Oct. 15, 2015.
Tailgate Scout About page <http://tailgatescout.com/site/about/> Date of download: Oct. 15, 2015.
Thanigavel, M.; "Li-Fi Technology in Wireless Communication", International Journal of Engineering Research & Technology (IJERT), ISSN: 2278-0181, vol. 2 Issue 10, Oct. 2013.
Wang et al., Hongwei; "A Reservation-based Smart Parking System", The First International Workshop on Cyber-Physical Networking Systems, 2011.
Williams, George; "5 Easy Speech-to-Text Solutions", The Chronicle of Higher Education, ProfHacker, Teaching, Tech, and Productivity. Mar. 3, 2010.
Won, Eun Tae; "Visible Light Communication: Tutorial", Project: IEEE P802.15 Working Group for Wireless Personal Area Networks (WPANs), Mar. 9, 2008.
YouTube, "Twitter Helmet to Let User Tweet With Their Heads?", Anonymex, published on Apr. 17, 2014.
PCT Application No. PCT/US2015/033613 International Search Report and Written Opinion mailed Sep. 1, 2015.
U.S. Appl. No. 14/788,754 Office Action mailed Aug. 20, 2015.
U.S. Appl. No. 14/798,201 Office Action mailed Oct. 8, 2015.
U.S. Appl. No. 14/798,339 Office Action mailed Sep. 4, 2015.
U.S. Appl. No. 14/840,840 Office Action mailed Oct. 30, 2015.
U.S. Appl. No. 14/840,855 Office Action mailed Oct. 27, 2015.
U.S. Appl. No. 15/078,778 Office Action mailed May 11, 2017.
U.S. Appl. No. 14/798,201 Final Office Action mailed Jun. 2, 2017.
U.S. Appl. No. 14/798,339 Office Action mailed May 10, 2017.

\* cited by examiner

WIRELESS SYSTEM FOR SOCIAL MEDIA MANAGEMENT

CROSS-REFERENCE TO RELATED APPLICATIONS

The present application claims the priority benefit of U.S. provisional application No. 62/008,483 filed Jun. 5, 2014 and entitled "Tweeting VLC," the disclosure of which is hereby incorporated by reference.

BACKGROUND

Field of Invention

The present invention generally relates to input devices. More specifically, the present invention relates to hands-free input devices with social media capabilities.

Description of the Related Art

Traditionally, a social networking website may allow its users to share a variety of types of content, including multimedia (e.g., images, videos), hyperlinks, and short text messages with other users of a social networking website. Businesses, athletics associations, and professional athletes each use social media to communicate directly with users of such social networking websites who are fans of particular athletes, organizations, athletics associations, businesses, products, brands, promotions, games, and other events and activities.

Social media posts from these persons and organizations are sometimes integrated with television broadcasts of games and news stories. In some cases, these social media posts are integrated or displayed alongside live broadcasted videos in real-time.

Typically, these social media posts are made by persons with access to a text input device, such as a keyboard of a computer, tablet, smartphone, or other network connected mobile device. However, these methods of entering text input can be inconvenient, difficult, or entirely insufficient to use in situations where a user posting content to the social media website has little or no free use of their hands, such as professional athletes actively participating in televised sporting events. Thus, athletes are often limited from publishing real-time social media posts to fans using the social media website or watching a televised broadcast while participating in the event. This limitation prevents players as well as teams and sponsoring businesses from benefiting from such social media interactions with audience members in real-time during a sporting event.

Further social media posts are typically not easily filtered by recipient location or ticket status. For example, an athlete publishing a social media post during a sporting event typically must publish the social media post publicly without any differentiation between readers within the stadium in which the athlete is playing and readers outside of the stadium.

Thus, an input device is needed allowing a user to publish social media content in a hands-free manner, and further allowing the user to publish social media content to a limited audience.

SUMMARY OF THE CLAIMED INVENTION

One exemplary method for publishing text based on recorded audio describes receiving an audio input at a receiver, the audio input recorded by a microphone of a recorder device. The method also describes executing instructions stored in memory. Execution of instructions by the processor may perform a variety of operations. The operations include processing the audio input to detect a spoken activation code. The operations include parsing a subset of the audio input following the detected spoken activation code using a speech recognition module, the subset including one or more words. The operations include generating textual data based on the one or more words parsed by the speech recognition system. The operations also include publishing the textual data to a plurality of reader devices using one or more wireless transmitters.

One exemplary system for publishing text based on recorded audio provides a receiver to receive an audio input recorded by a microphone of a recorder device. The system also provides a wireless transmitter. The system also provides a memory. The system also provides a processor coupled to the memory, the receiver, and the transmitter. Execution of instructions stored in memory by the processor may perform a variety of operations. The operations include processing the audio input to detect a spoken activation code. The operations include parsing a subset of the audio input following the detected spoken activation code using a speech recognition module, the subset including one or more words. The operations include generating textual data based on the one or more words parsed by the speech recognition system. The operations also include publishing the textual data to a plurality of reader devices using one or more wireless transmitters.

One exemplary non-transitory computer-readable storage medium is also described, the non-transitory computer-readable storage medium having embodied thereon a program executable by a processor to perform an exemplary method for publishing text based on recorded audio. The exemplary program method describes receiving an audio input at a receiver, the audio input recorded by a microphone of a recorder device. The program method also describes processing the audio input to detect a spoken activation code. The program method also describes parsing a subset of the audio input following the detected spoken activation code using a speech recognition module, the subset including one or more words. The program method also describes generating textual data based on the one or more words parsed by the speech recognition system. The program method also describes publishing the textual data to a plurality of reader devices using one or more wireless transmitters.

DETAILED DESCRIPTION

A user may speak an audio input into a microphone of a user device (e.g., a sport helmet). The user device then transmits the audio input to a receiver. The receiver, upon receiving the audio input, routes the audio to a processor that processes the audio input to detect a spoken activation code. The processor then parses a subset of the audio input (e.g., the subset including one or more words) following the activation code and generates textual data based the parsed audio subset. The textual data may optionally be edited to replace one or more pre-identified catchphrases (e.g., swearwords or product names) with replacement phrases (e.g., swear censors) or hyperlinks (e.g., leading to product websites). The textual data is then transmitted to reader devices via transmitters, which may optionally transmit the textual data to a selective group of reader devices (e.g., stadium attendees).

Figure 1:
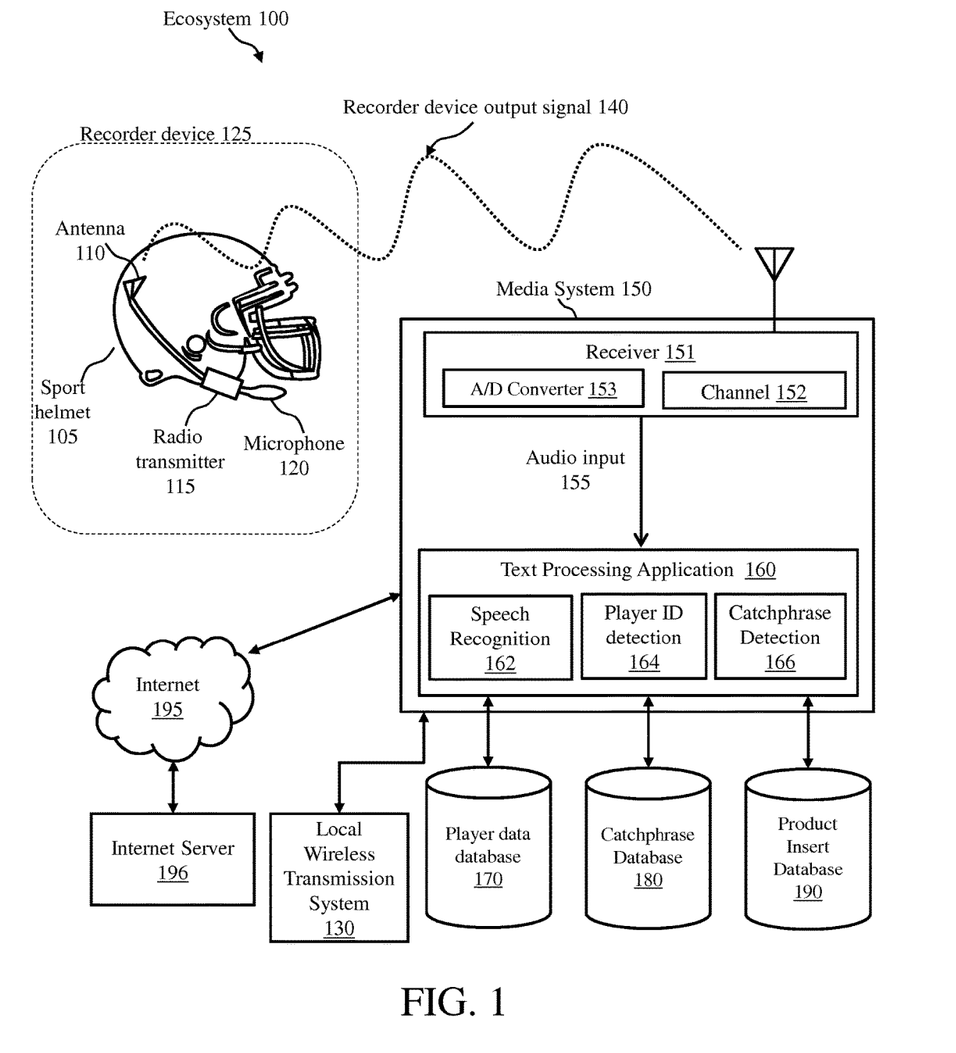
FIG. 1 illustrates an exemplary device ecosystem for publishing text based on recorded audio.

FIG. 1 illustrates an exemplary device ecosystem for publishing text based on recorded audio.

The exemplary ecosystem 100 of FIG. 1 includes a recorder device 125, which in the ecosystem 100 includes a sport helmet 105 (e.g., a football helmet, a hockey helmet), a microphone 120, a radio transmitter 115 connected to the microphone 120, and an antenna 110 connected to the radio transmitter 115. In another ecosystem, the broadcaster device 125 may use a different form factor rather than a sport helmet 105, such as another form of sport equipment (e.g., a ball, a hockey stick, a golf club, a baseball bat, a shoulder pad, a uniform, a cap), a mobile device (e.g., a smartphone, a tablet device, a portable media player device, a portable video game console), a wearable device.

If the recorder device 125 takes the form of a wearable device, it may be primarily intended to be worn around a user's wrist (e.g., a watch or bracelet), neck (e.g., a necklace or scarf), arm (e.g, an armband or elbow brace), hand (e.g., a glove), finger (e.g., a ring), head (e.g., a hat or helmet or headband or headlamp or mask or pair of glasses), ear (e.g., an earpiece or headset), mouth (e.g. a mouthguard or retainer or dental device), leg (e.g., a knee brace or leg holster or pair of pants), torso (e.g., a shirt or sweater or jacket), chest (e.g., a heart monitor chest band/patch, a respiratory monitor chest band/patch), pelvic area (e.g., an undergarment or a swimsuit or a jock strap), waist (e.g., a belt), foot (e.g., a shoe or sock or ankle brace), or another area of the user's body.

While the radio transmitter 115 is referred to as a "radio" transmitter, it need not be limited to transmission via radio waves. The radio transmitter 115 may transmit a recorder device output signal 140 using a Wi-Fi connection module, a 3G/4G/LTE cellular connection module, a Bluetooth connection module, a Bluetooth low energy connection module, Bluetooth Smart connection module, a near field communication module, a radio wave communications module, a magnetic induction power transmitter/receiver, or a magnetic resonance power transmitter/receiver, an electromagnetic transmission module, or some combination thereof.

The ecosystem 100 also includes a media system 150. The media system 150 includes a receiver 151. The receiver 151 may receive a recorder device output signal 140 transmitted by the antenna 110 of the recorder device 125. The receiver 151 may receive the signal 140 using a Wi-Fi connection module, a 3G/4G/LTE cellular connection module, a Bluetooth connection module, a Bluetooth low energy connection module, Bluetooth Smart connection module, a near field communication module, a radio wave communications module, a magnetic induction power transmitter/receiver, or a magnetic resonance power transmitter/receiver, an electromagnetic transmission module, or some combination thereof.

The receiver 151 may include a "channel" function 152 for changing a transmission parameter, such as a radio frequency channel or other parameter that affects which transmissions are received by the receiver 151. The receiver 151 may also include an Analog-Digital Converter 153 for converting an analog signal (e.g., an analog radio signal) into a digital signal (e.g., a digital audio signal). The Analog-Digital Converter 153 can thus be used to generate an audio input 155 based on the recorder device output signal 140, the audio input 155 to be fed into the text processing application 160 of the media system 150.

The audio input is fed into the text processing application 160 of the media system 150. A player ID detection module 164 can be used to determine the identity of the speaker whose voice was recorded by the recording device 125. This identification process can be done a number of ways. For example, a speaker can be identified by a particular channel, frequency, or other parameter related to how the recorder device 125 of that speaker broadcast the signal 140. A speaker can also be identified if the signal 140 and/or audio input 155 included an identifier, such as a number or string, that uniquely identifies the recorder device 125 or the speaker. The speaker can also be identified by interacting with a speech recognition module 162 in order to biometrically identify the speaker based on speech patterns, speech tonality, speech speed, and other biometric parameters that can be determined from an audio recording. The term "player" in the Player ID detection module 164 refers to an embodiment in which the speaker is an athlete or a "player" of a sport, though it may also refer to any other type of speaker.

The term "player" refers to an embodiment in which the speaker is an athlete or a "player" of a sport, though it may also refer to any other type of speaker.

The text processing application 160 also feeds the audio input 155 into a speech recognition module 162, which performs a speech-to-text function. The speech recognition module 162 may thus generate textual data based on the audio input 155. The speech recognition module 162 may interact with a catchphrase detection module 166, which may recognize a particular set of predetermined "catchwords" or "catchphrases" stored in one or more data structures (e.g., a catchphrase database 180 and a product insert database 190) that should trigger particular actions by the media system 150 (e.g., adjusting which portions of the audio are converted into text by the speech recognition module 162, replacing words, inserting words, inserting hyperlinks). In some embodiments, the speech recognition module 162 may generate textual data based on only a subset off the audio input 155, such as a section of the audio input after a spoken "trigger" catchphrase (e.g., "begin recording" or "unmute") and/or before a "conclusion" catchphrase (e.g., "end recording" or "mute"), as detected by the catchphrase detection module 166 in conjunction with the speech recognition module 162.

Figures 2A, 2B:
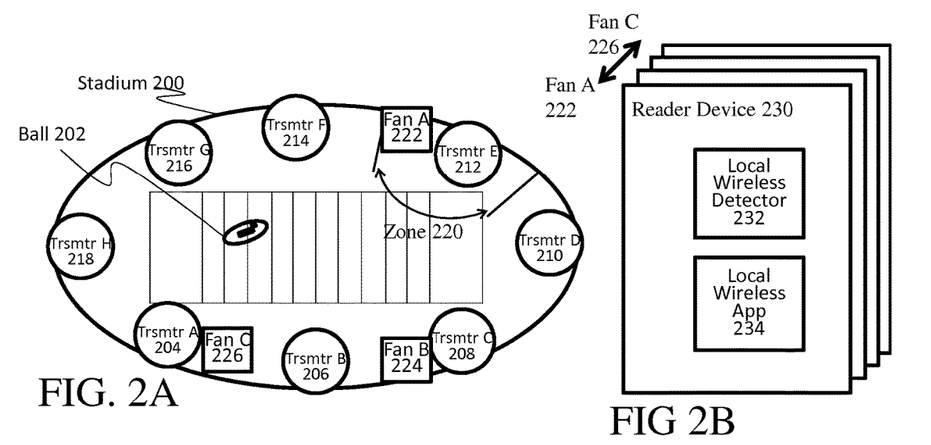
FIG. 2A illustrates an exemplary transmitter arrangement in a football stadium.
FIG. 2B illustrates an exemplary reader device.
Figure 2C:
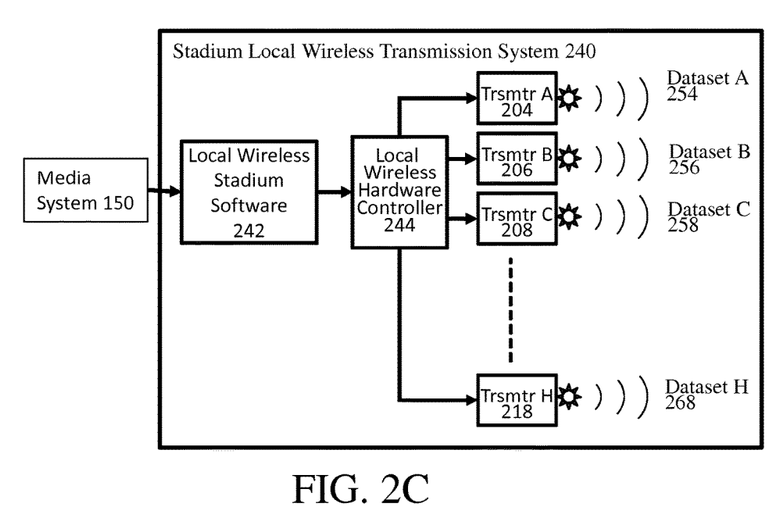
FIG. 2C illustrates an exemplary stadium-based wireless transmission system.
Figure 3A:
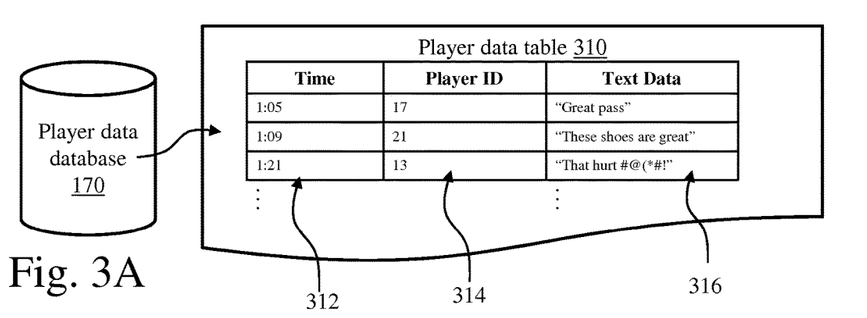
FIG. 3A illustrates an exemplary player data database.
Figure 3B:
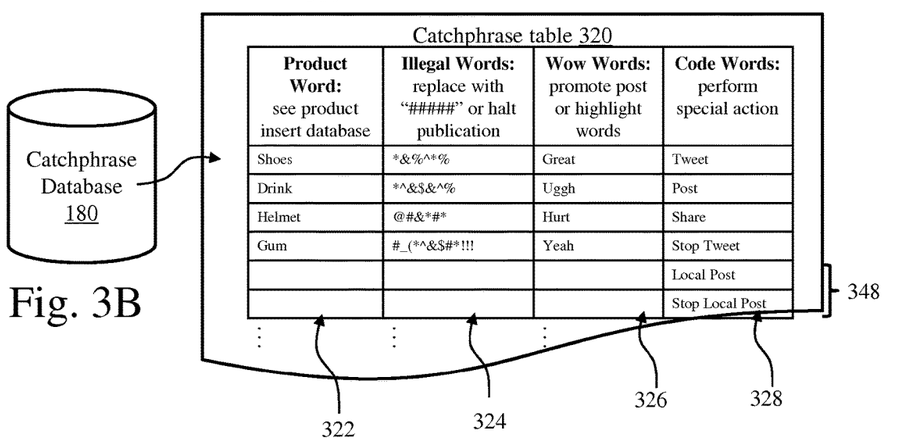
FIG. 3B illustrates an exemplary catchphrase database.
Figure 3C:
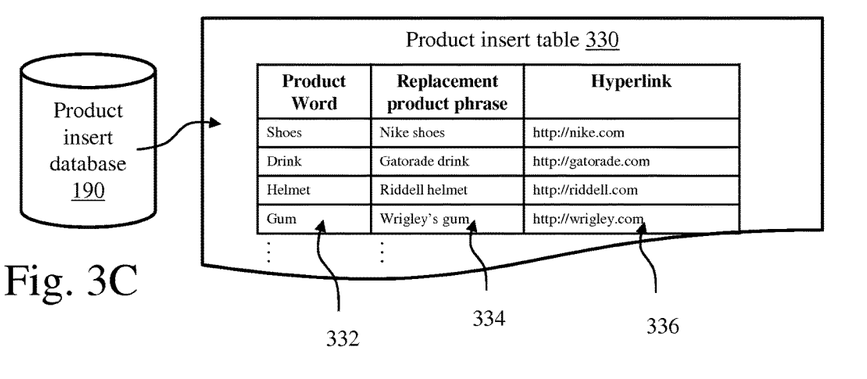
FIG. 3C illustrates an exemplary product insert database.

The catchphrase detection module 166 may also be used for other purposes, as further exemplified in the catchphrase database 180 of FIG. 3B and the product insert database 190 of FIG. 3C. For example, the catchphrase detection module 166 can be used to detect and replace "illegal" words, such as swearwords, or promote "wow" words, such as "amazing" or "hurt," by either promoting posts including those words on any social media platform through which they are published or by bolding, underlining, or italicizing those "wow" words. The catchphrase detection module 166 can also be used to detect product words as described in the product insert database 190, and replace them with branded product names and/or add associated hyperlinks. The catchphrase detection module 166 can also be used to detect trigger words signifying the beginning of an audio recording or speech recognition period and conclusion words signifying the end of an audio recording or speech recognition period and signifying a trigger to publish the resulting textual data online through the internet 195 to an internet server 196 of a social media platform or locally using a local wireless transmission system 130 as described further in FIG. 2A, FIG. 2B, and FIG. 2C.

While the media system 150 is illustrated as including a speech recognition module 162 and a catchphrase detection module 166, the recorder device 125 may also include similar capabilities (not shown). For example, a user of the recorder device 125 may be able to use a catchphrase to begin transmission of recorded audio through the signal 140 (e.g., "begin recording" or "unmute"), to conclude transmission of recorded audio through the signal 140 (e.g., "end recording" or "mute"), to power off the recorder device 125 (e.g., "power off"), or to perform a variety of other functions.

FIG. 2A illustrates an exemplary transmitter arrangement in a football stadium.

The stadium 200 of FIG. 2A includes eight transmitters, labeled as Transmitter A 204, Transmitter B 206, Transmitter C 208, Transmitter D 210, Transmitter E 212, Transmitter F 214, Transmitter G 216, and Transmitter H 218. In other embodiments, more transmitters, or fewer transmitters, may be used.

The stadium 200 also includes at least three fans, including Fan A 222 (located near Transmitter E 212 and within Zone 220), Fan B 224 (located near Transmitter C 208), and Fan C 226 (located near Transmitter A 204). Each of these fans may have a reader device 230 as described in FIG. 2B.

The transmitter may be any type of transmission system. For example, each transmitter may transmit a dataset using a Wi-Fi connection module, a 3G/4G/LTE cellular connection module, a Bluetooth connection module, a Bluetooth low energy connection module, Bluetooth Smart connection module, a near field communication module, a radio wave communications module, a microwave communications module, a magnetic induction transmitter, a magnetic resonance power transmitter, an electromagnetic transmission module, a visible light communication (VLC) transmission module, a laser transmission module, an ultrasonic transmission module, an infrasonic transmission module, or some combination thereof. Each transmitter may include any number of sub-transmitters.

Each transmitter may allow for localized transmission of data within a particular zone. For example, Transmitter E 212, located in Zone 220, may transmit data to reader devices physically located in Zone 220. For example, Transmitter E 212 may transmit a Dataset E to reader devices 230 in Zone 220 (e.g., including the reader device of Fan A 222) using Bluetooth, an ultrasonic speaker system, or an audience-facing VLC light transmitter.

Alternately, a different transmitter could transmit data to Zone 220. For example, Transmitter A 204 could transmit data across the sport field to Zone 220. For example, Transmitter A 204 may transmit a Dataset A 254 to reader devices 230 in Zone 220 (e.g., including the reader device of Fan A 222) using across-stadium VLC light transmitters (e.g., which may used focused beams or lasers), directed radio waves, or directed ultrasonic audio speakers with noise cancelling for other parts of the stadium.

While the transmitters may transmit data to any reader device 230 in their respective zone, in some cases, the data may be protected so that only some reader devices (e.g., reader devices authorized after purchasing a ticket) can read the transmission. This can be performed by registering authorized reader devices 230 in an authorization database or data structure (not shown), registering owners of the reader devices 230 in an authorization database or data structure (not shown), sending a password to the reader device 230 through which the transmitted data can be read, or sending a security key (e.g., an encryption/decryption key) that can be used to decrypt the transmitted data for reading.

The stadium 200 may also include a ball 202, or a variety of other sport-related equipment.

FIG. 2B illustrates an exemplary reader device.

The reader device 230 may be any type of computing device, such as a smartphone, a tablet device, a wearable device (which may be any type of wearable device as described in relation to the recorder device 125 of FIG. 1), a laptop computer, a portable video game console, a portable media device.

The reader device 230 may include a non-transitory computer-readable memory (not shown) and a processor (not shown). The reader device 230 can also include a local wireless detector 232, which may be a hardware module through which the transmission of the transmitter can be read, and may be a detector or receiver of any of the types described above in relation to the transmitters of FIG. 2A. The local wireless detector 232 may also include software components stored in the memory and executed by the processor.

The reader device may also include a local wireless software application ("app") 234 which may be used to read the data transmitted by the transmitters of FIG. 2A. The local wireless app 234 may be stored in memory and executed by the processor. The local wireless app 234 may include a social media function, an e-mail function, or a messaging function, and may be operable to read textual data and, optionally, other types of data (e.g., images, videos, audio, or hyperlinks to web pages) transmitted by at least one of the transmitters of FIG. 2A.

FIG. 2C illustrates an exemplary stadium-based wireless transmission system.

The stadium-based wireless transmission system 240 of FIG. 2C is one example of a local wireless transmission system 130 as illustrated in FIG. 1. The stadium-based wireless transmission system 240 may receive a data set from the media system 150 (e.g., including the textual data of FIG. 1). The data set may pass through a local wireless stadium software 242, which may assist in determining which transmitters should be used to transmit the data set, and to which zones it should be transmitted. The local wireless stadium software 242 may then pass the data set to a local wireless hardware controller 244, which may be a subsystem that controls the transmitters and directs the data set to the transmitters selected by the local wireless stadium software 242 in order to transmit the data set to the intended zones. In the exemplary stadium-based wireless transmission system 240 of FIG. 2C, Transmitter A 204 transmits the data set within Data Set A 254, Transmitter B 206 transmits the data set within Data Set B 256, Transmitter C 208 transmits the data set within Data Set C 258, and Transmitter H 218 transmits the data set within Data Set H 268.

FIG. 3A illustrates an exemplary player data database.

The player data database 170 may include data identifying speakers (e.g., who may be players/athletes in a sport game), and may also identify textual data associated with that speaker (e.g., textual data from the speech recognition module 162 of FIG. 1 based on the signal 140 carrying that speaker's recorded speech.

For example, the exemplary player data table 310 illustrates exemplary information representative of the types of data that the player data database 170 may include. For instance, the player data table 310 includes a time column 312, indicating a time of speech or a time of publication of the speech. The player data table 310 also includes a player ID number column 314, identifying each speaker with a number. The player data table 310 also includes a "text data" column 316, identifying the textual data corresponding to the speech of the player identified in the same row, at the time identified in the same row.

FIG. 3B illustrates an exemplary catchphrase database.

The catchphrase database 180 may include various words (i.e., "catchwords") and phrases (i.e., "catchphrases") that trigger various actions depending at least on the type of the catchword or catchphrase.

For example, the exemplary catchphrase table 320 illustrates exemplary information representative of the types of data that the catchphrase database 180 may include. For instance, the catchphrase table 320 includes a "product word" column 322, indicating words that should be replaced with words related to sponsors and/or hyperlinks related to sponsors as indicated by the product insert database 190 of FIG. 3C. The catchphrase table 320 also includes an "illegal word" column 324, indicating words such as swearwords that should be omitted or replaced with censor marks or less offensive words. Illegal words may trigger the halt of publication of a post or transmission, or may pass it to an administrator who must approve it before it is posted or transmitted. The catchphrase table 320 also includes a "wow word" column 326, indicating words such as "great" or "hurt" which indicate passion and may indicate that a post or transmission containing a "wow word" should be promoted, or the "wow word" should be highlighted (e.g., bolded, underlined, italicized, colored, enlarged, or some combination thereof). The catchphrase table 320 also includes a "code word" column 328, indicating words that perform other actions, such as "tweet," which may mark the beginning of text that should be published as a post on the Twitter social network, or "stop tweet," which may conclude the post and trigger publishing. There may be special "local code words" 348 associated with the local wireless transmission system 130, such as "local post," which may mark the beginning of text that should be published as a post to local reader devices through the transmitters of FIG. 2A, or "stop local post," which may conclude such a post and trigger local wireless publishing through the transmitters.

FIG. 3C illustrates an exemplary product insert database.

The product insert database 190 may include various product words/phrases, which may also be identified in the catchphrase database 180, that trigger actions such as replacement or editing of the product word/phrase for a replacement product phrase associated with a particular brand of product (e.g., of a brand that sponsors the stadium, the athlete, the game, the sports equipment used, a sport association, a team, an event, or some combination thereof) and possibly with a hyperlink associated with the brand.

For example, the exemplary product insert table 330 illustrates exemplary information representative of the types of data that the product insert database 190 may include. For instance, the product insert table 330 includes a "product word" column 332 (which may mirror "product word" column 322 or may include additional words/phrases), indicating words that should be replaced with words related to sponsors and/or hyperlinks related to sponsors. The product insert table 330 also includes a "replacement product phrase" column 334 indicating the text that each product word should be replaced for (e.g., "shoes" should be replaced with "Nike shoes"). The product insert table 330 also includes a "hyperlink" column 336 indicating the Internet destination of a hyperlink (e.g., "http://nike.com") with which the product word should be replaced, the text of the hyperlink being the replacement product phrase identified at the same row. The inclusion of hyperlink information 336 is optional within the product insert database 190.

Figure 4:
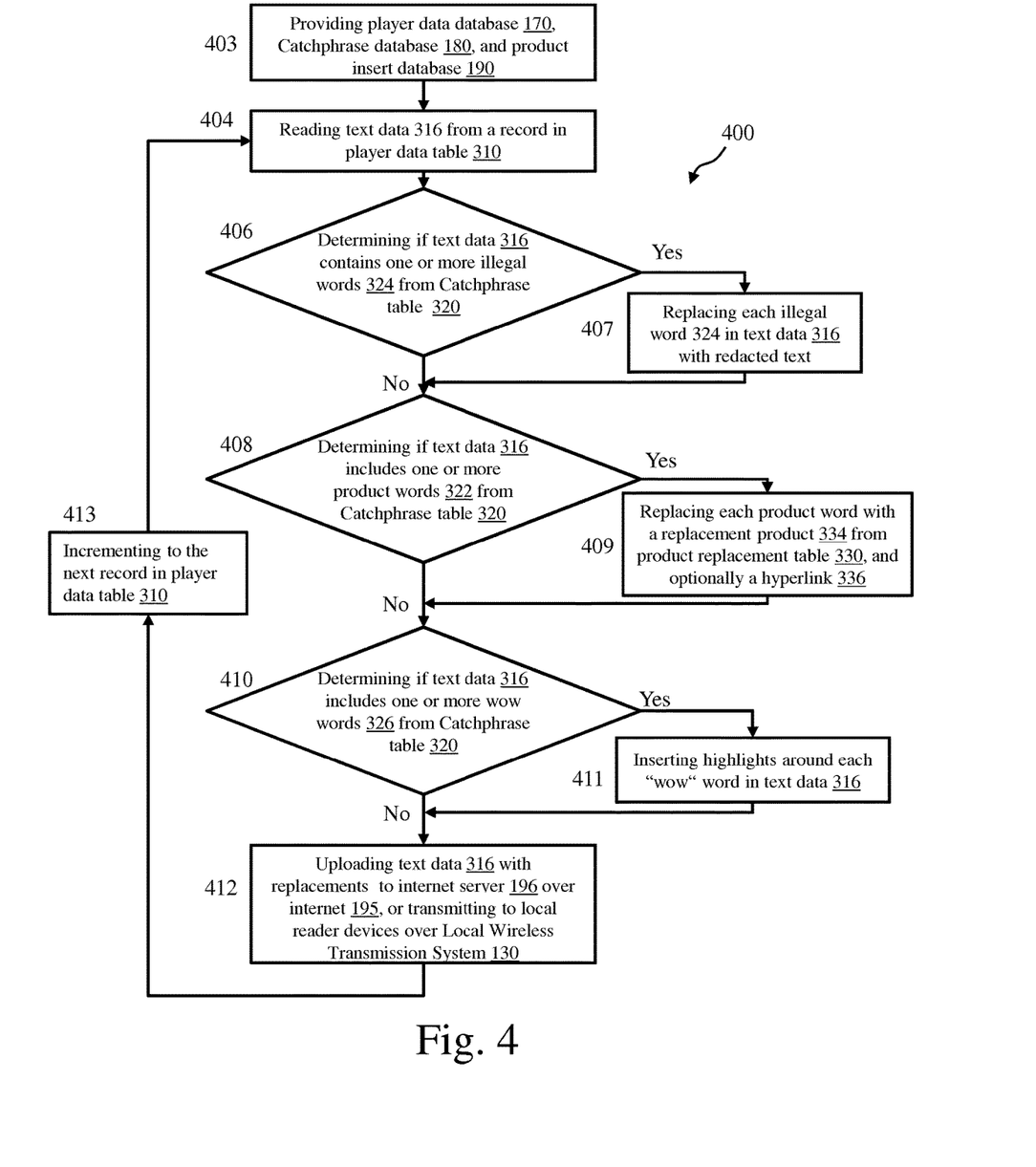
FIG. 4 is a flow diagram illustrating exemplary publishing operations based on generated text data.

FIG. 4 is a flow diagram illustrating exemplary publishing operations based on generated text data.

The exemplary publishing operations 400 may begin with providing a player data database 170, a catchphrase database 180, and a product insert database 190 in step 403. In step 404, text data (e.g., from column 316) may then be read from a record in the player data table 310.

In step 406, it may be determined whether the text data (e.g., from column 316) includes one or more illegal words (e.g., from column 324) from the catchphrase table 320. If it does, as in step 407, each illegal word (e.g., from column 324) may be replaced in the text data with redacted text.

Next, in step 408, it may be determined whether the text data (from column 316) includes one or more product words (e.g., from column 322 and/or column 332) from the catchphrase table 320 or product insert table 330. If it does, as in step 409, each product word (e.g., from column 322 and/or column 332) may be replaced in the text data with a replacement product phrase (e.g., from column 334) that may also include a hyperlink (e.g., destination from column 336).

In step 410, it may be determined whether the text data (e.g., from column 316) includes one or more "wow" words (e.g., from column 316) from the catchphrase table 320. If it does, as in step 411, each "wow" word (e.g., from column 316) may be highlighted, or the post in which it is contained may be promoted.

Next, in step 412, the text data (e.g., from column 316), which all the edits specified above, may be published, either to the internet server 196 over the internet 195, or by transmitting to local reader devices 230 over a local wireless transmission system 130. Next, in step 413, the operations may be repeated starting at step 404 for the incrementally next record in the player data table 310.

Figure 5:
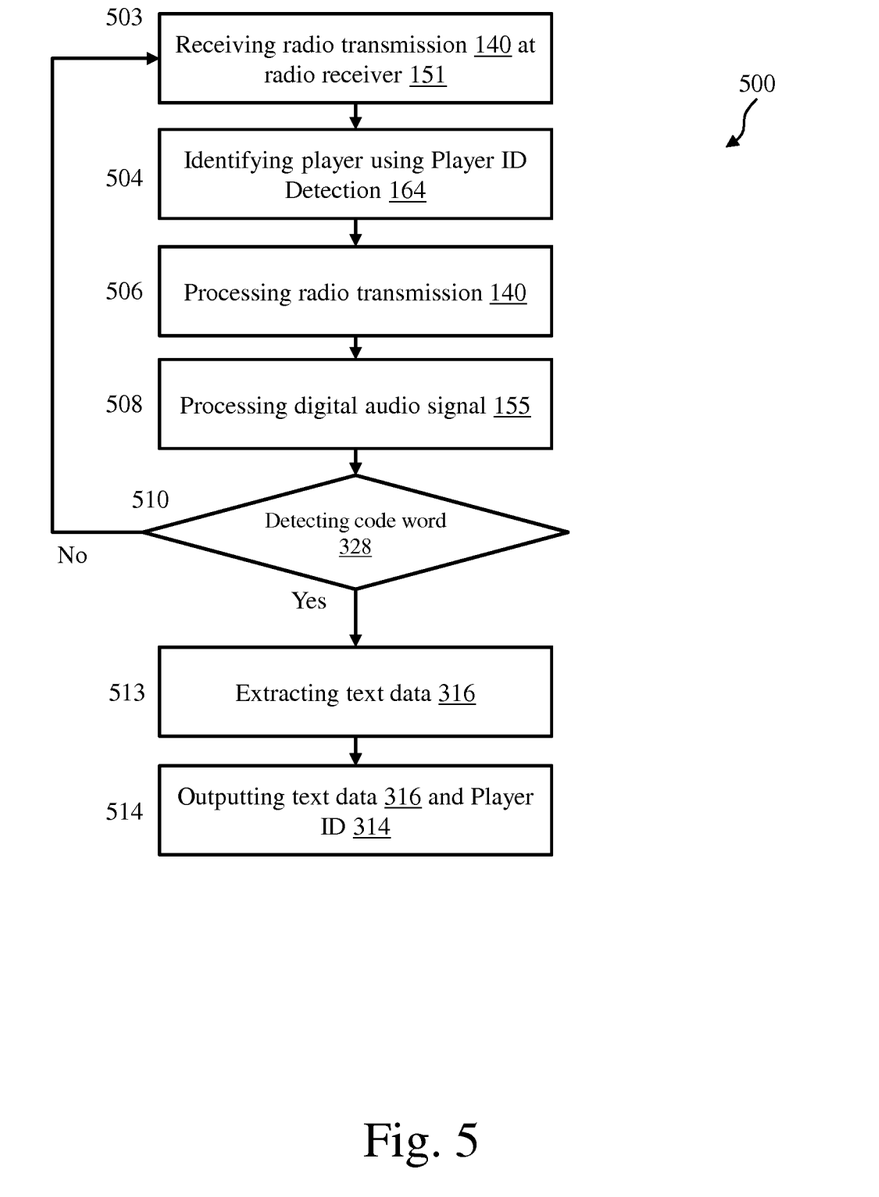
FIG. 5 is a flow diagram illustrating text generation and output operations based on audio input.

FIG. 5 is a flow diagram illustrating text generation and output operations based on audio input.

The text generation and output operations 500 begin with, at step 503, receiving radio transmission 140 at the radio receiver 151. At step 504, the media system 150 identifies the player using the player ID detection 164. At step 506, the media system 150 processes the radio transmission 140, which may include analog-to-digital conversion using the analog-digital converter 153. At step 508, the media system 150 processes the digital audio signal 155 (i.e., the "audio input" 155).

If the media system 150 does not detect a code word (e.g., from column 328) at step 510, the media system 150 may revert back to step 503 and continue to receive radio transmissions 140 at the radio receiver 151. If the media system 150 does detect a code word (e.g., from column 328) at step 510, the media system 150 may then extract text data (e.g., illustrated in column 316) at step 513 using the speech recognition module 162. At step 514, the media system 150 may output the text data (e.g., illustrated in column 316) and player ID 314, either to the player data database 170, or by publishing as in step 312 of FIG. 4. The operations may then begin anew at step 503.

Figure 6:
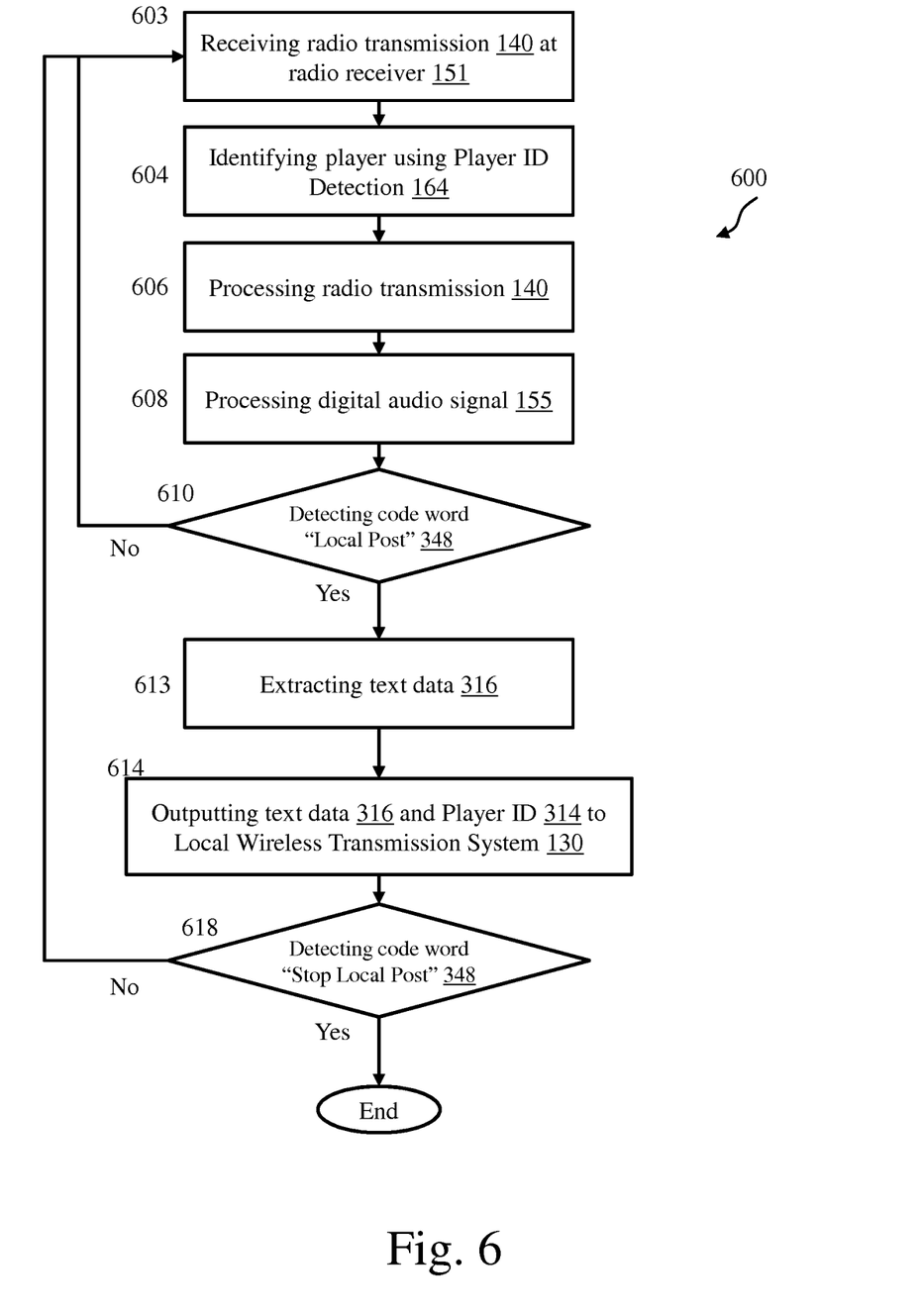
FIG. 6 is a flow diagram illustrating text generation and local wireless output operations based on audio input.

FIG. 6 is a flow diagram illustrating text generation and local wireless output operations based on audio input.

The text generation and local wireless output operations 600 begin with, at step 603, receiving radio transmission 140 at the radio receiver 151. At step 604, the media system 150 identifies the player using the player ID detection 164. At step 606, the media system 150 processes the radio transmission 140, which may include analog-to-digital conversion using the analog-digital converter 153. At step 608, the media system 150 processes the digital audio signal 155 (i.e., the "audio input" 155).

If the media system 150 does not detect a local code word (e.g., such as "Local Post" as identified in column 328 and rows 348) at step 610, the media system 150 may revert back to step 503 and continue to receive radio transmissions 140 at the radio receiver 151. If the media system 150 does detect a local code word (e.g., such as "Local Post" as identified in from column 328 and rows 348) at step 610, the media system 150 may then extract text data (e.g., illustrated in column 316) at step 613 using the speech recognition module 162. At step 614, the media system 150 may output the text data (e.g., illustrated in column 316) and player ID 314 to the local wireless transmission system 130. The media system may continue outputting text data by reverting back to step 603 if a second, concluding local code word (e.g., such as "Stop Local Post" as identified in column 328 and rows 348) is not detected in step 618. If the second, concluding local code word (e.g., such as "Stop Local Post" as identified in column 328 and rows 348) is detected in step 618, the operations may conclude.

Figure 7:
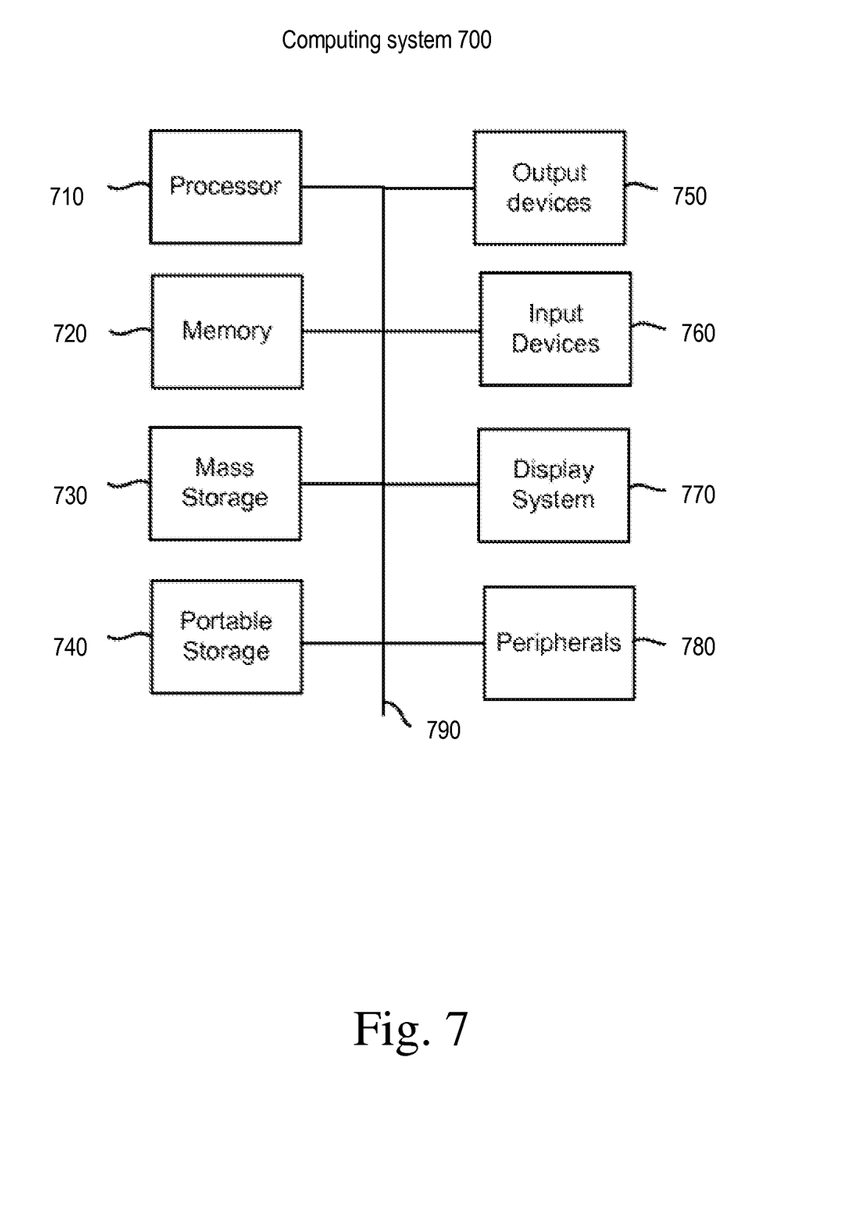
FIG. 7 is a block diagram of an exemplary computing device that may be used to implement an embodiment of the present invention.

FIG. 7 illustrates an exemplary computing system 700 that may be used to implement an embodiment of the present invention. The computing system 700 of FIG. 7 includes one or more processors 710 and memory 710. Main memory 710 stores, in part, instructions and data for execution by processor 710. Main memory 710 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and main memory 710 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 710.

Portable storage device 740 operates in conjunction with a portable non-volatile storage medium, such as a floppy disk, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD) or other suitable display device. Display system 770 receives textual and graphical information, and processes the information for output to the display device.

Peripherals 780 may include any type of computer support device to add additional functionality to the computer system. For example, peripheral device(s) 780 may include a modem or a router.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for publishing text based on recorded audio, the method comprising:

receiving a wirelessly transmitted audio signal at a wireless signal receiver, the wirelessly transmitted audio signal conveying audio recorded by a microphone of a recorder device, the recorder device being a sport equipment object; and executing instructions stored in memory, wherein the execution of instructions by a processor:

processes the audio input to detect a spoken activation code, parses a subset of the audio input following the detected spoken activation code using a speech recognition module, the subset including a plurality of words, generates textual data based on the plurality of words parsed by the speech recognition system, modifies the textual data by replacing a catchphrase within the textual data with a replacement phrase associated with a product and by generating a hyperlink within the textual data, the hyperlink corresponding to the replacement phrase and leading to a website associated with the product, generates encrypted textual data by encrypting the textual data, and transmits the encrypted textual data to a plurality of reader devices via a wireless transmitter, wherein the plurality of reader devices are physically located within a transmission zone of the wireless transmitter, wherein a first reader device of the plurality of reader devices decrypts the encrypted textual data after receipt from the wireless transmitter.

2. The method of claim 1, wherein execution of the instructions by the processor:

detects a swear phrase in the textual data before the textual data is encrypted, the swear phrase identified in a catchphrase data structure, and modifies the textual data to replace the detected swear phrase with a swear replacement phrase.

3. The method of claim 1, wherein execution of the instructions by the processor detects the catchphrase in the textual data before modifying the textual data, the product phrase identified in wherein a catchphrase data structure identifies the catchphrase, the replacement phrase, and the website associated with the product.

4. The method of claim 3, wherein the website associated with the product is corresponds to at least one of a service, a business, a brand, a sport association, an organization, or an advertisement.

5. The method of claim 1, wherein the sport equipment object is one of a ball, a bat, a club, a stick, a uniform, a shoulder pad, a cap, or a helmet.

6. The method of claim 1, wherein the plurality of reader devices includes reader devices logged into a social media user account.

7. The method of claim 1, wherein the plurality of reader devices includes reader devices connected to a first wireless network.

8. The method of claim 1, wherein the plurality of reader devices each receive a transmission signal from the wireless transmitter.

9. The method of claim 1, wherein the transmission zone of the wireless transmitter is a defined zone within an event venue.

10. A system for publishing text based on recorded audio, the system comprising:

a wireless signal receiver to receive a wirelessly transmitted audio signal that conveys audio recorded by a microphone of a recorder device, the recorder device being a sport equipment object;

a wireless transmitter;

a memory;

a processor coupled to the memory, the wireless signal receiver, and the wireless transmitter, wherein execution of instructions stored in memory by the processor:

processes the audio input to detect a spoken activation code, parses a subset of the audio input following the detected spoken activation code using a speech recognition module, the subset including a plurality of words, generates textual data based on the plurality of words parsed by the speech recognition system, modifies the textual data by replacing a catchphrase within the textual data with a replacement phrase associated with a product and by generating a hyperlink within the textual data, the hyperlink corresponding to the replacement phrase and leading to a website associated with the product, generates encrypted textual data by encrypting the textual data, and transmits the encrypted textual data to a plurality of reader devices via the wireless transmitter, wherein the plurality of reader devices are physically located within a transmission zone of the wireless transmitter, wherein a first reader device of the plurality of reader devices decrypts the encrypted textual data after receipt from the wireless transmitter.

11. The system of claim 10, wherein execution of the instructions by the processor:

detects a swear phrase in the textual data before the textual data is encrypted, the swear phrase identified in a catchphrase data structure, and modifies the textual data to replace the detected swear phrase with a swear replacement phrase.

12. The system of claim 10, wherein execution of the instructions by the processor detects the catchphrase in the textual data before modifying the textual data, wherein a catchphrase data structure identifies the catchphrase, the replacement phrase, and the website associated with the product.

13. The system of claim 12, wherein the website associated with the product is corresponds to at least one of a service, a business, a brand, a sport association, an organization, or an advertisement.

14. The system of claim 10, wherein the sport equipment object is one of a ball, a bat, a club, a stick, a uniform, a shoulder pad, a cap, or a helmet.

15. The system of claim 10, wherein the plurality of reader devices includes reader devices logged into a social media user account.

16. The system of claim 10, wherein the plurality of reader devices includes reader devices connected to a first wireless network.

17. The system of claim 10, wherein the plurality of reader devices each receive a transmission signal from the wireless transmitter.

18. The system of claim 10, wherein the transmission zone of the wireless transmitter is a defined zone within an event venue.

19. A non-transitory computer-readable storage medium, having embodied thereon a program executable by a processor to perform a method for publishing text based on recorded audio, the method comprising:

receiving a wirelessly transmitted audio signal at a wireless signal receiver, the wirelessly transmitted audio signal conveying audio recorded by a microphone of a recorder device, the recorder device being a sport equipment object;

processing the audio input to detect a spoken activation code;

parsing a subset of the audio input following the detected spoken activation code using a speech recognition module, the subset including a plurality of words;

generating textual data based on the plurality of words parsed by the speech recognition system;

modifying the textual data by replacing a catchphrase within the textual data with a replacement phrase associated with a product and by generating a hyperlink within the textual data, the hyperlink corresponding to the replacement phrase and leading to a website associated with the product;

generating encrypted textual data by encrypting the textual data; and transmitting the encrypted textual data to a plurality of reader devices via a wireless transmitter, wherein the plurality of reader devices are physically located within a transmission zone of the wireless transmitter, wherein a first reader device of the plurality of reader devices decrypts the encrypted textual data after receipt from the wireless transmitter.

* * * * *